US012579835B2

(12) United States Patent
Zhang

(10) Patent No.: US 12,579,835 B2
(45) Date of Patent: Mar. 17, 2026

(54) INFORMATION PROCESSING DEVICE, INFORMATION PROCESSING METHOD, AND COMPUTER-READABLE RECORDING MEDIUM FOR DISTINGUISHING OBJECT AND SHADOW THEREOF IN IMAGE

(71) Applicant: OMRON Corporation, Kyoto (JP)

(72) Inventor: Chao Zhang, Kyoto (JP)

(73) Assignee: OMRON Corporation, Kyoto (JP)

( * ) Notice: Subject to any disclaimer, the term of this patent is extended or adjusted under 35 U.S.C. 154(b) by 291 days.

(21) Appl. No.: 18/280,955

(22) PCT Filed: Mar. 16, 2022

(86) PCT No.: PCT/JP2022/011801
§ 371 (c)(1),
(2) Date: Sep. 8, 2023

(87) PCT Pub. No.: WO2022/224638
PCT Pub. Date: Oct. 27, 2022

(65) Prior Publication Data
US 2024/0037976 A1     Feb. 1, 2024

(30) Foreign Application Priority Data
Apr. 23, 2021     (JP) ................................. 2021-073468

(51) Int. Cl.
*G06V 40/10*          (2022.01)
*G06V 10/20*          (2022.01)
(Continued)

(52) U.S. Cl.
CPC .............. *G06V 40/10* (2022.01); *G06V 10/22* (2022.01); *G06V 10/25* (2022.01); *G06V 10/255* (2022.01); *G06V 10/267* (2022.01); *G06V 10/40* (2022.01)

(58) Field of Classification Search
CPC ...... G06V 40/10; G06V 10/255; G06V 10/22; G06V 10/25; G06V 10/40; G06T 7/60; G06T 7/00
See application file for complete search history.

(56) References Cited

U.S. PATENT DOCUMENTS

| | | | | |
|---|---|---|---|---|
| 2013/0184592 A1* | 7/2013 | Venetianer | .............. | G06T 7/246 |
| | | | | 600/476 |
| 2017/0104915 A1* | 4/2017 | Adachi | .................. | H04N 23/62 |

(Continued)

FOREIGN PATENT DOCUMENTS

| | | | | | |
|---|---|---|---|---|---|
| CN | 101187982 A | * | 5/2008 | ............. | G06V 20/58 |
| CN | 119444995 A | * | 2/2025 | | |

(Continued)

OTHER PUBLICATIONS

Ning Jin and F. Mokhtarian, "Image-based shape model for view-invariant human motion recognition," 2007 IEEE Conference on Advanced Video and Signal Based Surveillance, London, 2007, pp. 336-341, doi: 10.1109/AVSS.2007.4425333. (Year: 2007).*

(Continued)

*Primary Examiner* — Michael Robert Cammarata
(74) *Attorney, Agent, or Firm* — JCIPRNET

(57)          ABSTRACT

Provided is an information processing device, an information processing method, and a computer-readable recording medium. A first circumscribed polygon region calculation unit calculates a first circumscribed polygon region as a convex hull circumscribed region that contains a feature region. A principal axis of inertia calculation unit calculates a principal axis of inertia for the feature region. A region division unit uses the principal axis of inertia to divide the feature region. On the basis of the area ratio of the two second circumscribed polygon regions and the first circumscribed polygon region as convex hull circumscribed regions that respectively contain the divided feature regions, a (Continued)

region selection unit selects either the first circumscribed polygon region or the two second circumscribed polygon regions. An object differentiation unit executes an object detection processing on the selected first circumscribed polygon region or two second circumscribed polygon regions.

9 Claims, 6 Drawing Sheets

(51) Int. Cl.
　　*G06V 10/22*　　　(2022.01)
　　*G06V 10/25*　　　(2022.01)
　　*G06V 10/26*　　　(2022.01)
　　*G06V 10/40*　　　(2022.01)

(56)　　　　　References Cited

U.S. PATENT DOCUMENTS

2019/0012537 A1 * 1/2019 Heimberger ............... G06T 7/60
2023/0419500 A1 * 12/2023 Zhang .................... G06V 10/44

FOREIGN PATENT DOCUMENTS

| CN | 119495113 | A | * | 2/2025 | ........... G06V 40/172 |
|---|---|---|---|---|---|
| JP | 2002197463 | A | * | 7/2002 | |
| JP | 2008245063 | | | 10/2008 | |
| JP | 2011043969 | | | 3/2011 | |
| JP | 2011043969 | A | * | 3/2011 | |
| JP | 2012043021 | A | * | 3/2012 | |
| JP | 2015079339 | A | * | 4/2015 | |
| JP | 2022070648 | | | 5/2022 | |
| WO | WO-2021108913 | A1 | * | 6/2021 | ............... G06T 7/80 |
| WO | WO-2022091577 | A1 | * | 5/2022 | ............. G06V 40/10 |

OTHER PUBLICATIONS

"International Search Report (Form PCT/ISA/210) of PCT/JP2022/011801", mailed on Jun. 14, 2022, with English translation thereof, pp. 1-4.

"Written Opinion of the International Searching Authority (Form PCT/ISA/237) of PCT/ JP2022/011801", mailed on Jun. 14, 2022, with English translation thereof, pp. 1-8.

Toshihiro Ogata et al., "A study of separation of moving objects and their shadows," IEICE Technical Report, Jun. 1997, pp. 1-12.

* cited by examiner

INFORMATION PROCESSING DEVICE, INFORMATION PROCESSING METHOD, AND COMPUTER-READABLE RECORDING MEDIUM FOR DISTINGUISHING OBJECT AND SHADOW THEREOF IN IMAGE

CROSS-REFERENCE TO RELATED APPLICATION

This application is a 371 application of the International PCT application serial no. PCT/JP2022/011801, filed on Mar. 16, 2022, which claims the priority benefits of Japan Patent Application No. 2021-073468, filed on Apr. 23, 2021. The entirety of each of the above-mentioned patent applications is hereby incorporated by reference herein and made a part of this specification.

BACKGROUND

Technical Field

The present invention relates to an information processing device, an information processing method, and a computer-readable recording medium recording a control program that processes imaged images.

Related Art

In imaging devices such as digital cameras, it is known to detect objects such as human bodies from the imaged images by executing a predetermined information processing (data processing) on the imaged images, and to display the detected objects or frames enclosing the objects on display devices such as display units.

In such imaging devices, it is required to differentiate between the object to be imaged and its shadow in the imaged image. Patent Literature 1 discloses a technique for differentiating between an object to be imaged, for example, a human body, and shadow of the human body by processing the imaged image based on a predetermined standard luminance value.

CITATION LIST

Patent Literature

[Patent Literature 1] Japanese Patent Laid-Open No. 2008-245063

SUMMARY

Technical Problem

However, in the conventional technology as described above, there were cases where the object could not be accurately differentiated from the imaged image depending on the imaging conditions of the imaged image. Specifically, in the conventional technology, when the surrounding brightness is dark or when there is backlighting, the respective luminance values of the object and its shadow in the imaged image become close to each other, and the object and shadow cannot be separated, making it impossible to accurately differentiate the object from the imaged image.

The present invention has been made in view of the above problems and aims to provide an information processing device, an information processing method, and a control program that can accurately differentiate an object from an imaged image regardless of imaging conditions.

Solution to Problem

To solve the aforementioned problems, the present invention adopts the following configuration.

An information processing device according to one aspect of the present invention is an information processing device that processes imaged images, which includes: a feature region detection unit that detects a feature region having a predetermined feature from an input imaged image; a first circumscribed polygon region calculation unit that calculates a first circumscribed polygon region as a convex hull circumscribed region that contains the feature region; a principal axis of inertia calculation unit that calculates a principal axis of inertia for the feature region; a region division unit that uses the calculated principal axis of inertia to divide the feature region; a second circumscribed polygon region calculation unit that calculates two second circumscribed polygon regions as convex hull circumscribed regions that respectively contain the divided feature regions; a region selection unit that selects either the first circumscribed polygon region or the two second circumscribed polygon regions on the basis of an area ratio of the two second circumscribed polygon regions and the first circumscribed polygon region; and an object differentiation unit that executes an object detection processing on the first circumscribed polygon region or the two second circumscribed polygon regions selected by the region selection unit.

Furthermore, an information processing method according to one aspect of the present invention is an information processing method that processes imaged images, which includes: a feature region detection process that detects a feature region having a predetermined feature from an input imaged image; a first circumscribed polygon region calculation process that calculates a first circumscribed polygon region as a convex hull circumscribed region that contains the feature region; a principal axis of inertia calculation process that calculates a principal axis of inertia for the feature region; a region division process that uses the calculated principal axis of inertia to divide the feature region; a second circumscribed polygon region calculation process that calculates two second circumscribed polygon regions as convex hull circumscribed regions that respectively contain the divided feature regions; a region selection process that selects either the first circumscribed polygon region or the two second circumscribed polygon regions on the basis of an area ratio of the two second circumscribed polygon regions and the first circumscribed polygon region; and an object differentiation process that executes an object detection processing on the first circumscribed polygon region or the two second circumscribed polygon regions selected in the region selection process.

Furthermore, a computer-readable recording medium recording a control program according to one aspect of the present invention is a computer-readable recording medium recording a control program that operates a computer as the information processing device, wherein the computer is operated as the feature region detection unit, the first circumscribed polygon region calculation unit, the principal axis of inertia calculation unit, the region division unit, the second circumscribed polygon region calculation unit, the region selection unit, and the object differentiation unit.

Effects

According to the present invention, it is possible to provide an information processing device, an information processing method, and a control program that can accurately differentiate an object from an imaged image regardless of the imaging conditions.

DESCRIPTION OF THE EMBODIMENTS

Embodiment

§ 1 Application Example

Figure 1:
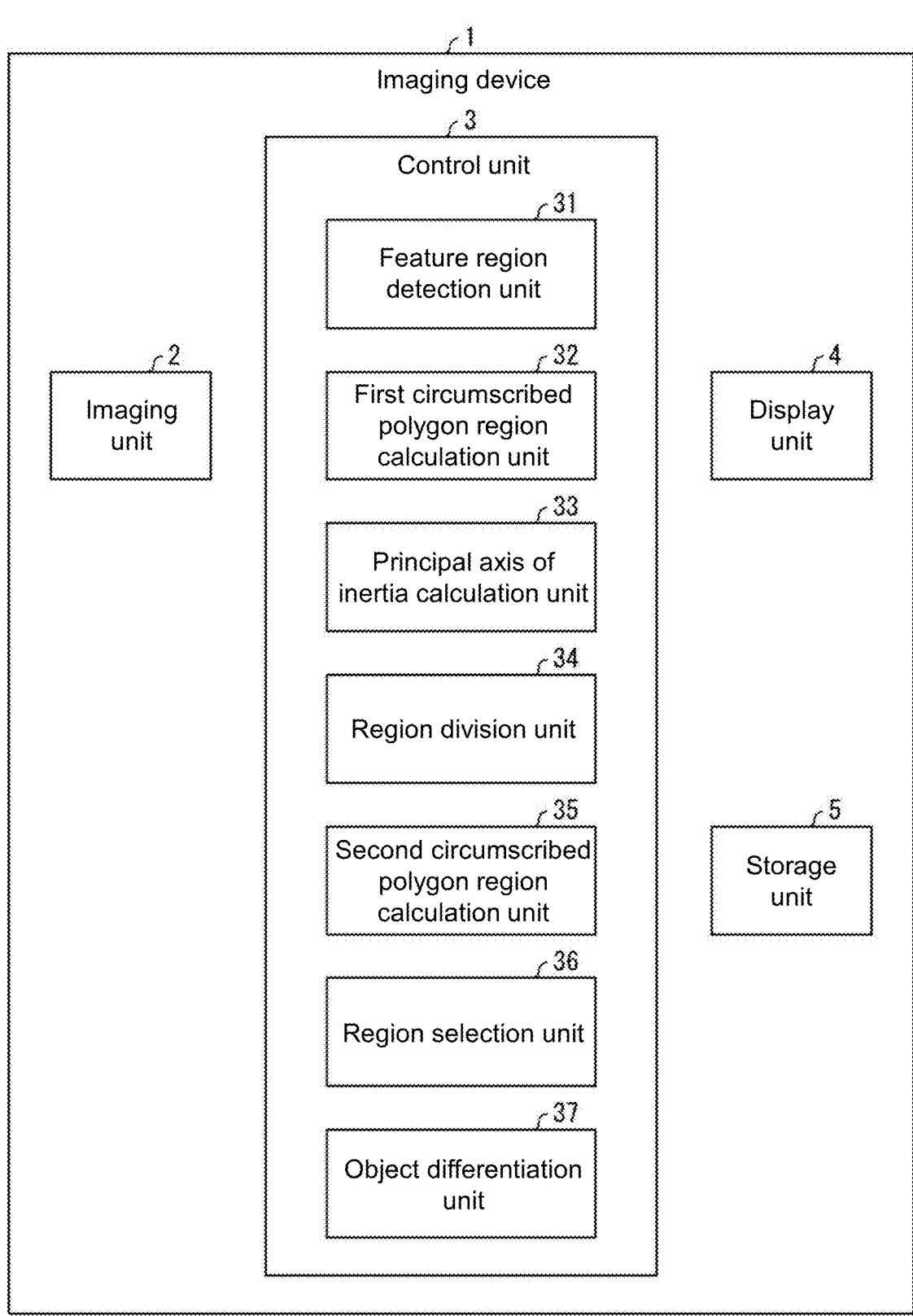
FIG. 1 is a block diagram showing a configuration example of an imaging device according to one embodiment of the present invention.

First, using FIG. 1, an example of a scene where the present invention is applied will be explained. FIG. 1 is a block diagram showing a configuration example of an imaging device according to one embodiment of the present invention. In the following description, an example in which the present invention is applied to an imaging device such as a digital camera will be explained. However, the present invention is not limited to any particular information processing device that processes imaged images, and the present invention may also be applied to mobile terminals such as tablet devices and smartphones, or information processing terminals such as personal computers with an imaging unit for outputting imaged images is provided separately.

As shown in FIG. 1, an imaging device 1 according to the embodiment includes an imaging unit 2, and a control unit 3 that processes imaged images from the imaging unit 2. The control unit 3 includes a feature region detection unit 31, a first circumscribed polygon region calculation unit 32, a principal axis of inertia calculation unit 33, a region division unit 34, a second circumscribed polygon region calculation unit 35, a region selection unit 36, and an object differentiation unit 37.

The feature region detection unit 31 detects a feature region having a predetermined feature from an input imaged image. The first circumscribed polygon region calculation unit 32 calculates a first circumscribed polygon region as a convex hull circumscribed region that contains the feature region. The principal axis of inertia calculation unit 33 calculates a principal axis of inertia for the feature region. The convex hull circumscribed region mentioned above refers to a convex-shaped region that is delimited by lines (circumscribed lines) sequentially connecting two adjacent pixels located on the outermost part of the feature region so as to include all pixels included in the feature region in the imaged image.

The region division unit 34 uses the calculated principal axis of inertia to divide the feature region into two. The second circumscribed polygon region calculation unit 35 calculates two second circumscribed polygon regions as convex hull circumscribed regions that respectively contain the divided feature regions. The region selection unit 36 selects either the first circumscribed polygon region or the two second circumscribed polygon regions on the basis of an area ratio of the two second circumscribed polygon regions and the first circumscribed polygon region. The object differentiation unit 37 executes an object detection processing on the selected first circumscribed polygon region or the two second circumscribed polygon regions.

In this way, the control unit 3 obtains a first circumscribed polygon region (convex hull circumscribed region) that contains a feature region from an input imaged image. Moreover, the control unit 3 calculates the principal axis of inertia for the feature region and uses the calculated principal axis of inertia to divide the feature region. Furthermore, the control unit 3 obtains two second circumscribed polygon regions (convex hull circumscribed regions) that respectively contain the divided feature regions. Moreover, the control unit 3 selects a convex hull circumscribed region for object detection processing from either the two second circumscribed polygon regions after division or the first circumscribed polygon region before division, and executes an object detection processing on the selected convex hull circumscribed region to differentiate an object such as a human body from an input imaged image.

Thus, according to the embodiment, the imaging device 1 detects a feature region having a predetermined feature, calculates the principal axis of inertia for the detected feature region, and uses this principal axis of inertia to divide the detected feature region. Moreover, in a first circumscribed polygon region that contains a feature region before division and second circumscribed polygon regions that respectively contain two feature regions after division, a convex hull circumscribed region that contains the corresponding feature region is used. This allows for accurate and precise selection processing of either the first circumscribed polygon region or the two second circumscribed polygon regions in the region selection unit, and high-precision execution of object detection processing in the object differentiation unit. As a result, regardless of imaging conditions, the imaging device 1 can accurately differentiate an object from an imaged image.

§ 2 Configuration Example

<About the Configuration of Imaging Device 1>

As shown in FIG. 1, the imaging device 1 includes the imaging unit 2, the control unit 3, a display unit 4, and a storage unit 5. The imaging device 1 displays the imaged image that is imaged by the imaging unit 2 on the display unit 4 or stores it in the storage unit 5. Moreover, the imaging device 1 differentiates a predetermined object such as a human body included in the imaged image by executing a predetermined (data) processing by the control unit 3 on the imaged image, and displays it, including the differentiation result, on the display unit 4 or stores it in the storage unit 5.

The imaging unit 2 includes an imaging element (not shown), and images moving images or still images according to the user's operation instructions for the imaging device 1. The imaging unit 2 outputs the imaged images of moving images or still images to the control unit 3.

The display unit 4 includes elements such as a liquid crystal display panel and light-emitting diodes, and performs predetermined information display. For example, the display unit 4 may be configured to function as an input part that accepts instructions from users by being integrated with a touch panel.

The storage unit 5 stores various data used by the control unit 3. Furthermore, the storage unit 5 may store various software that makes a computer function as the control unit 3 when executed by the computer. Moreover, a threshold value used for region selection processing to be described later in the region selection unit 36 is stored in the storage unit 5.

The control unit 3 is an arithmetic device that includes a function to comprehensively control each part of the imaging device 1. The control unit 3 may control each part of the imaging device 1 by executing a program stored in one or more memories (e.g., RAM, ROM, etc.) by one or more processors (e.g., CPU, etc.), for example. Also, as described above, the control unit 3 includes multiple functional blocks, each of which executes predetermined data processing.

Here, the configuration of the control unit 3 will be explained. The control unit 3 includes the feature region detection unit 31 that detects a feature region having a predetermined feature from the input imaged image, the first circumscribed polygon region calculation unit 32 that calculates a first circumscribed polygon region, and the principal axis of inertia calculation unit 33 that calculates a principal axis of inertia for the feature region.

The control unit 3 includes the region division unit 34 that uses the principal axis of inertia calculated by the principal axis of inertia calculation unit 33 to divide the feature region detected by the feature region detection unit 31, and the second circumscribed polygon region calculation unit 35 that calculates two second circumscribed polygon regions that respectively contain the divided feature regions from the region division unit 34.

The control unit 3 includes the region selection unit 36 that selects either the first circumscribed polygon region calculated by the first circumscribed polygon region calculation unit 32, or the two second circumscribed polygon regions calculated by the second circumscribed polygon region calculation unit 35, and the object differentiation unit 37 that differentiates an object from the first circumscribed polygon region or the two second circumscribed polygon regions selected by the region selection unit 36.

§ 3 Operation Example

Operation Example of Imaging Device 1

Figure 2:
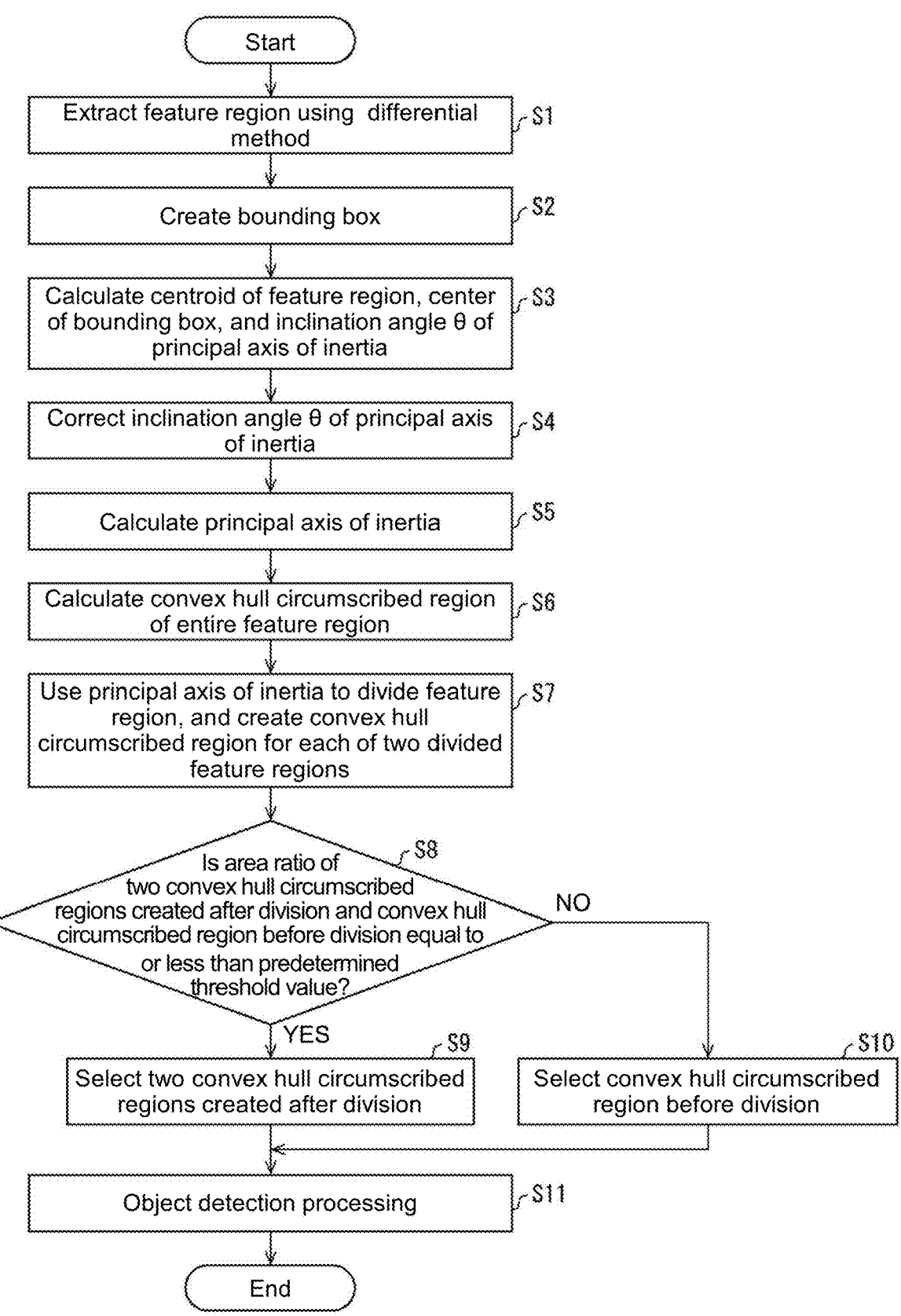
FIG. 2 is a flowchart showing an operation example of the imaging device.
Figure 3:
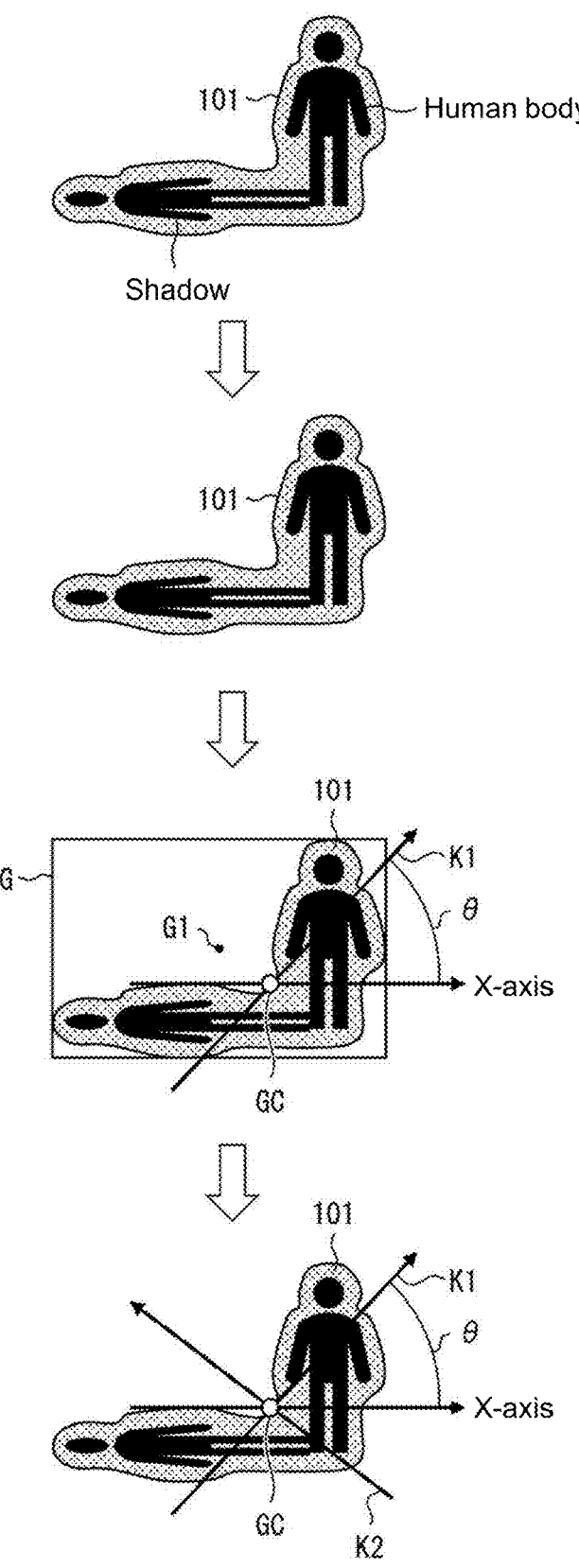
FIG. 3 is a diagram explaining a specific operation example of the imaging device.
Figure 4:
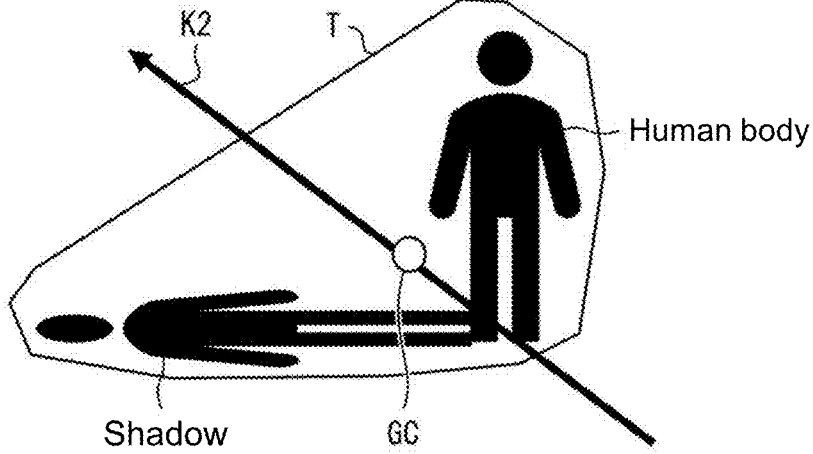
FIG. 4 is a diagram explaining another specific operation example of the imaging device.
Figure 4:
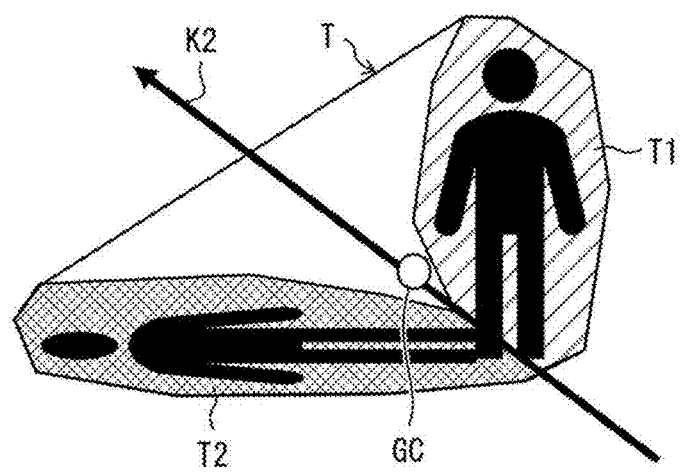

Referring to FIGS. 2 to 4, a specific operation example of the imaging device 1 according to the embodiment will be explained. FIG. 2 is a flowchart showing an operation example of the imaging device. FIG. 3 is a diagram explaining a specific operation example of the imaging device. FIG. 4 is a diagram explaining another specific operation example of the imaging device.

In FIG. 2, in step S1, the feature region detection unit 31 extracts a feature region having a predetermined feature from an imaged image input from the imaging unit 2, for example, using a differential method.

Next, in step S2, the first circumscribed polygon region calculation unit 32 creates a bounding box that contains the feature region detected by the feature region detection unit 31.

Then, in step S3, the principal axis of inertia calculation unit 33 calculates the centroid of the feature region and the center of the bounding box. Moreover, based on the centroid of the feature region, the principal axis of inertia calculation unit 33 calculates a first principal axis of inertia and further calculates an inclination angle $\theta$ of the first principal axis of inertia. As will be described later, the inclination angle $\theta$ is, for example, an angle of a principal axis of inertia with respect to the X-axis, among a horizontal axis (X-axis) and a vertical axis (Y-axis) in an imaged image.

Next, in step S4, the principal axis of inertia calculation unit 33 corrects the inclination angle $\theta$ obtained in step S3 by adding 90 degrees to the inclination angle $\theta$, and obtains a second principal axis of inertia whose inclination is different from that of the first principal axis of inertia obtained in step S3 by 90 degrees.

Then, in step S5, from among the first and second principal axes of inertia obtained in steps S3 and S4, respectively, the principal axis of inertia calculation unit 33 calculates a principal axis of inertia more suitable for the imaged image based on the calculated center of the bounding box.

Next, in step S6, the first circumscribed polygon region calculation unit 32 calculates a convex hull circumscribed region of the entire feature region extracted by the feature region detection unit 31.

Next, in step S7, the region division unit 34 uses the principal axis of inertia calculated in step S5 to divide the feature region extracted in step S1 into two. Then, the second circumscribed polygon region calculation unit 35 creates a convex hull circumscribed region for each of the two divided feature regions after division.

Next, in step S8, the region selection unit 36 determines whether or not the area ratio of the two convex hull circumscribed regions after division created in step S7 and the convex hull circumscribed region before division obtained in step S6 is equal to or less than a predetermined threshold value.

If the region selection unit 36 determines that the area ratio is equal to or less than the threshold value (YES in S8), the region selection unit 36 selects the two convex hull circumscribed regions after division (step S9) and outputs them to the object differentiation unit 37.

On the other hand, if the region selection unit 36 determines that the area ratio exceeds the threshold value (NO in S8), the region selection unit 36 selects the convex hull circumscribed region before division obtained in step S6 (step S10) and outputs it to the object differentiation unit 37.

Next, in step S11, the object differentiation unit 37 executes an object detection processing on either the two convex hull circumscribed regions after division or the convex hull circumscribed region before division selected by the region selection unit 36.

Moreover, in addition to the description of step S10, the region selection unit 36 may be configured to select a feature region before division or a bounding box that contains the feature region before division instead of a convex hull circumscribed region before division.

Here, using FIGS. 3 and 4, more specific operation examples of the imaging device 1 of the embodiment will be explained.

As shown in FIG. 3, the feature region detection unit 31 detects a feature region 101 that includes moving body pixels of a human body and moving body pixels of its shadow in an input image. This feature region detection unit 31 detects at least one of a region with movement, a region having pixel values within a predetermined range (brightness value of pixel), and a region enclosed by edges from the input image as the feature region 101.

In other words, the feature region detection unit 31 detects features such as "the region has movement", "the region has pixel values within a predetermined range", or "the region is enclosed by edges" as a predetermined feature. The pixel value within a predetermined range refers to, for example, the range of possible pixel value of a predetermined object such as a human body. Also, since imaging conditions such as brightness around an object change over time, the pixel value within a predetermined range may also be changed over time.

Furthermore, the feature region detection unit 31 uses a differential method, for example, to detect the feature region 101 that includes a moving object which is a predetermined object. Specifically, the feature region detection unit 31 determines whether there is movement by using a background differential method or an inter-frame differential method to detect the feature region 101 that includes moving body pixels of a human body and moving body pixels of its shadow.

In the background differential method, for example, among the imaged images, a pixel whose difference (absolute value) in the pixel value from a predetermined background image is equal to or larger than a predetermined value are detected as a pixel with movement (moving body pixel).

In the inter-frame differential method, for example, among current imaged images (current frame), a pixel whose difference in the pixel value from a past imaged image (past frame) is equal to or larger than a predetermined value is detected as a pixel with movement (moving body pixel). In this inter-frame differential method, for example, the past frame is a frame preceding a predetermined number of the current frame, and the predetermined number is one or more. This predetermined number may be decided according to the frame rate of information processing (information processing speed) in the control unit 3 or the frame rate of imaging processing (imaging processing speed) by the imaging unit 2.

Next, the first circumscribed polygon region calculation unit 32 calculates, for example, a bounding box that has a rectangular shape and that contains the feature region 101. Specifically, the first circumscribed polygon region calculation unit 32 obtains a bounding box G that includes moving body pixels of a human body and moving body pixels of the shadow in the region that contains the feature region 101. The bounding box G is formed by a rectangle that contains the feature region by lines parallel to the horizontal axis of the imaged image and lines parallel to the vertical axis.

Subsequently, the principal axis of inertia calculation unit 33 calculates the principal axis of inertia for the feature region detected by the feature region detection unit 31. Specifically, the principal axis of inertia calculation unit 33 obtains a centroid GC of the detected feature region 101 in the imaged image and obtains a center G1 of the calculated bounding box G. Moreover, the principal axis of inertia calculation unit 33 calculates a first principal axis of inertia K1 of the feature region 101 passing through the centroid GC.

Furthermore, the principal axis of inertia calculation unit 33 obtains the inclination angle $\theta$ of the first principal axis of inertia K1 with respect to the X-axis and further obtains a second principal axis of inertia K2, which intersects the X-axis at an angle (inclination angle ($\theta+90$)) obtained by adding 90 degrees to the inclination angle $\theta$, that is, orthogonal to the first principal axis of inertia K1.

Moreover, based on the positional relationship of the centroid GC of the feature region 101 to the center G1 of the bounding box G, the principal axis of inertia calculation unit 33 decides one principal axe of inertia for dividing the convex hull circumscribed region obtained in step S6, among the first principal axis of inertia K1 and the second principal axis of inertia K2 of the feature region 101.

Specifically, when the bounding box G is divided into four by an X-axis passing through the center G1 of the bounding box G and a Y-axis orthogonal to this in the imaged image by upper right part (first quadrant), lower right part (fourth quadrant), upper left part (second quadrant), and lower left part (third quadrant), the principal axis of inertia calculation unit 33 selects the first principal axis of inertia K1 when the centroid GC is located in the upper right part or lower left part. Also, the principal axis of inertia calculation unit 33 selects the second principal axis of inertia K2 when the centroid GC is located in the lower right part (fourth quadrant) or upper left part (second quadrant). That is, in the example shown in FIG. 3, since the centroid GC is located in the lower right part, the principal axis of inertia calculation unit 33 selects the second principal axis of inertia K2 as the principal axis of inertia for dividing the convex hull circumscribed region.

Thus, based on the positional relationship of the center G1 of the bounding box G in an imaged image and the centroid GC of a feature region, the principal axis of inertia calculation unit 33 decides a principal axis of inertia for dividing a convex hull circumscribed region (first circumscribed polygon region) from among the two principal axes of inertia existing in an circumscribed polygon region for calculating a principal axis of inertia. As a result, in the imaging device 1 according to the embodiment, the first circumscribed polygon region can be divided more appropriately, and an object included in the first circumscribed polygon region can be more accurately differentiated with high accuracy.

Moreover, the principal axis of inertia calculation unit 33 may decide the principal axis of inertia based on the positional relationship of the centroid of the feature region detected by the feature region detection unit and the centroid of the convex hull circumscribed region calculated by the first circumscribed polygon region calculation unit 32. Furthermore, the method that calculates the principal axis of inertia in the principal axis of inertia calculation unit 33 is not limited to these two methods mentioned above, and known calculation methods may be applied.

As shown in FIG. 4, the first circumscribed polygon region calculation unit 32 calculates a convex hull circumscribed region T that contains the feature region 101 (FIG. 3) of the entire moving body pixels, which include the moving body pixels of the human body and the moving body pixels of the shadow. This convex hull circumscribed region T is the smallest convex polygon (convex polyhedron) that includes all pixels contained in the feature region 101. Here, a convex polygon is a polygon composed only of vertices with an internal angle of less than 180°. More specifically, the convex hull circumscribed region T is formed by a shape that connects adjacent pixels that exist on the outermost part of the pixels included in the feature region 101 by straight lines.

Next, the region division unit 34 uses the second principal axis of inertia K2 calculated by the principal axis of inertia calculation unit 33 to divide the feature region. The second circumscribed polygon region calculation unit 35 obtains a convex hull circumscribed region T1 that contains a feature region that includes the moving body pixels of the human body belonging to one of the two feature regions after division, and a convex hull circumscribed region T2 that contains the feature region including moving body pixels of the shadow belonging to the other.

Then, if the region selection unit 36 determines that the area ratio (i.e., pixel number ratio) obtained by dividing the total area of the two convex hull circumscribed regions T1 and T2 after division by the area of the convex hull circumscribed region T before division is equal to or less than a threshold value, the region selection unit 36 selects the two convex hull circumscribed regions T1 and T2 and outputs them to the object differentiation unit 37. Also, if the region selection unit 36 determines that the area ratio exceeds the threshold value, the region selection unit 36 selects the convex hull circumscribed region T before division and outputs it to the object differentiation unit 37. Moreover, in the total area, if there is an overlapping part in the convex hull circumscribed regions T1 and T2, the area of the overlapping part is subtracted from the sum of areas of the convex hull circumscribed regions T1 and T2.

In this way, by comparing the area ratio of the total area of the two convex hull circumscribed regions T1 and T2 created after division and the convex hull circumscribed region T before division with a predetermined threshold value, the region selection unit 36 selects a convex hull circumscribed region for object detection processing by the object differentiation unit 37. As a result, in the imaging device 1 of the embodiment, for example, it is possible to accurately differentiate a human body. This is because, when a human body is included in a feature region, it is possible to obtain a divided region (convex hull circumscribed region T1) closer to a region that includes moving body pixels of a human body by dividing the feature region.

Next, the object differentiation unit 37 executes an object detection processing on the convex hull circumscribed region from the region selection unit 36 to differentiate whether or not the object included in the convex hull circumscribed region is a predetermined object such as a human body. Specifically, for example, the object differentiation unit 37 executes an object detection processing that combines image features such as HoG and Haar-like with boosting. The object differentiation unit 37 outputs the differentiation result to the display unit 4. Thus, on the display unit 4, it is possible to display the differentiation result of the object along with the imaged image from the imaging unit 2.

In addition to the above description, the object differentiation unit 37 may also use a trained model generated by deep learning such as R-CNN, Fast R-CNN, YOLO, SSD. Also, objects that the object differentiation unit 37 differentiates include, in addition to human bodies, for example, animals other than humans, vehicles such as automobiles, or architectural structures such as buildings.

As described above, in the imaging device 1 of the embodiment, the feature region detection unit 31 detects a feature region from the imaged image from the imaging unit 2. The first circumscribed polygon region calculation unit 32 calculates a first circumscribed polygon region as a convex hull circumscribed region that contains the feature region and a bounding box including the feature region. The principal axis of inertia calculation unit 33 calculates the principal axis of inertia for the feature region, and the region division unit 34 uses the calculated principal axis of inertia to divide the feature region into two. The second circumscribed polygon region calculation unit 35 calculates two second circumscribed polygon regions that respectively contain the feature regions after division as the convex hull circumscribed regions. The region selection unit 36 selects either the first circumscribed polygon region or the two second circumscribed polygon regions on the basis of the area ratio of the two second circumscribed polygon regions and the first circumscribed polygon region. The object differentiation unit 37 executes an object detection processing on either the selected first circumscribed polygon region or the two second circumscribed polygon regions. As a result, it is possible to appropriately and accurately execute selection processing of either the first circumscribed polygon region or two second circumscribed polygon regions in the region selection unit 36. As a result, the object differentiation unit 37 may executes an object detection processing with high accuracy. Thus, regardless of imaging conditions, the imaging device 1 of the embodiment can accurately differentiate an object from within an imaged image.

In the embodiment, the first circumscribed polygon region calculation unit 32 further calculates a bounding box that includes a feature region, and the principal axis of inertia calculation unit 33 calculates the principal axis of inertia for the feature region based on the centroid of the feature region and the center of the bounding box. This allows for easy improvement in the calculation accuracy of the principal axis of inertia, and hence, easy improvement in object differentiation accuracy.

Although the configuration in which the first circumscribed polygon region calculation unit 32 calculates the bounding box and convex hull circumscribed region has been described above, the embodiment is not limited thereto. For example, it may be configured such that the first circumscribed polygon region calculation unit 32 only calculates the convex hull circumscribed region, and a separately provided bounding box calculation unit calculates the bounding box.

Figure 5:
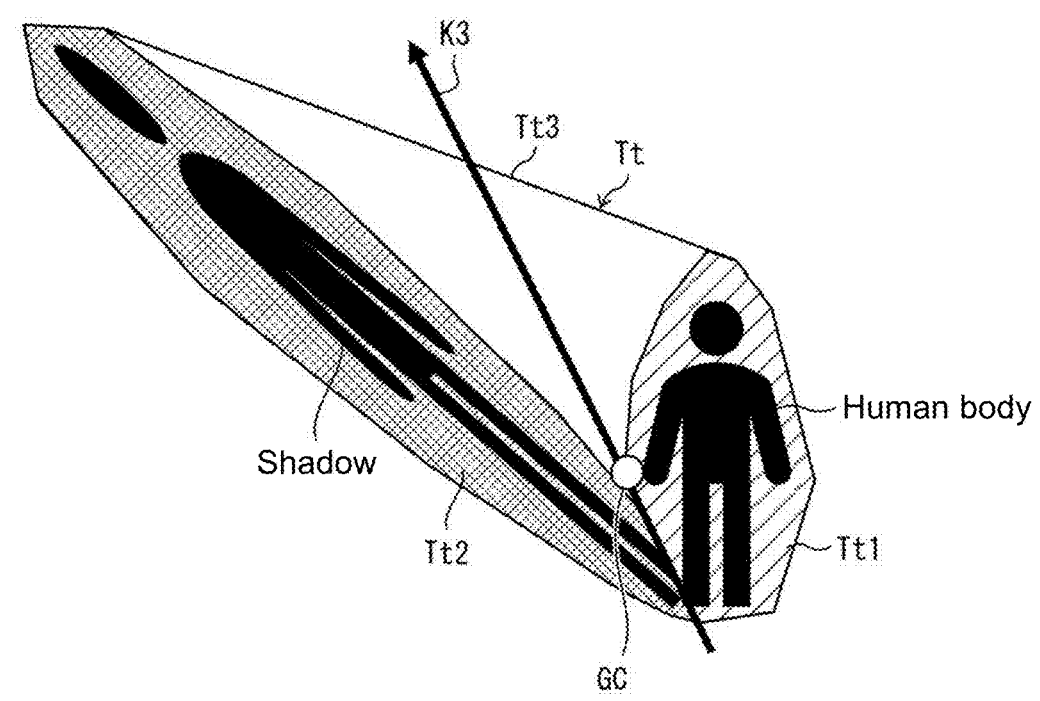
FIG. 5 is a diagram explaining an example of the effects in the imaging device.
Figure 6:
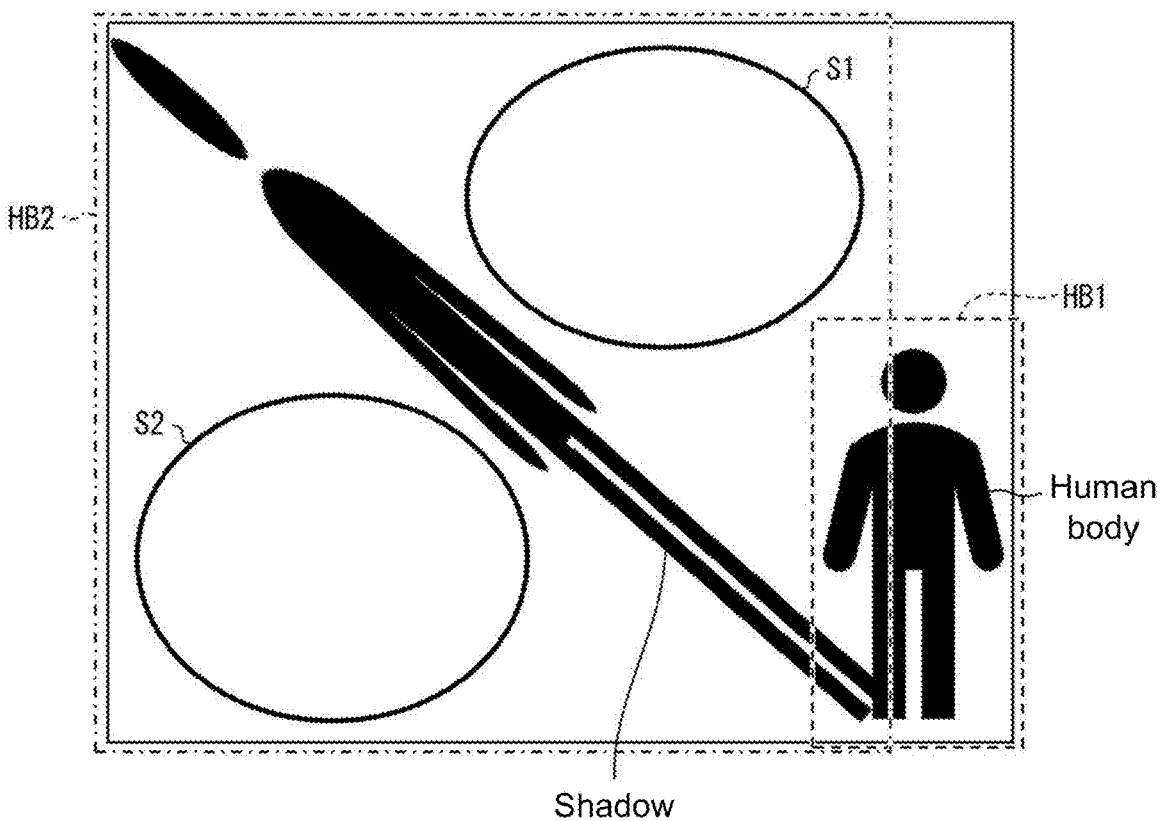
FIG. 6 is a diagram explaining problems in a comparative example.

Here, using FIGS. 5 and 6, the specific effects when using a convex hull circumscribed region as a first circumscribed polygon region in the imaging device 1 according to the embodiment will be explained. FIG. 5 is a diagram explaining an example of the effects in the imaging device. FIG. 6 is a diagram explaining problems in a comparative example.

As shown in FIG. 5, in an imaged image from an imaging unit 2, for example, when a shadow exists at an angle other than 90 degrees, for example, at an angle less than 90 degrees with respect to a human body, the first circumscribed polygon region calculation unit 32 calculates a convex hull circumscribed region Tt that contains a feature region of all moving body pixels including moving body pixels of the human body and the moving body pixels of the shadow. The region division unit 34 uses a principal axis of inertia K3 to divide the feature region, and the second circumscribed polygon region calculation unit 35 calculates a convex hull circumscribed region Tt1 including moving body pixels of the human body and a convex hull circumscribed region Tt2 including the moving body pixels of the shadow. Moreover, in the imaged image, a region obtained by subtracting the convex hull circumscribed regions Tt1 and Tt2 from the convex hull circumscribed region Tt becomes a convex hull circumscribed region Tt3 corresponding to space between the moving body pixels of the human body and the moving body pixels of the shadow.

Thus, in the imaging device 1 of the embodiment, even when a shadow exists at an angle other than 90 degrees with respect to a human body, by dividing the feature region and comparing the area ratio of the convex hull circumscribed region Tt before division and the convex hull circumscribed regions Tt1 and Tt2 after division with a threshold value, it is possible to calculate both the convex hull circumscribed region Tt1 closer to a region including moving body pixels of the human body and the convex hull circumscribed region Tt2 closer to a region including the moving body pixels of the shadow. Furthermore, in the embodiment, it is possible to make the convex hull circumscribed region Tt3 closer to space between the moving body pixels of the human body and the moving body pixels of the shadow. As a result, the imaging device 1 of the embodiment can accurately differentiate a human body and the shadow included in imaged images.

On the other hand, the results of verification for the comparative example are shown below. In this comparative example, unlike this embodiment, a bounding box is applied instead of a convex hull circumscribed region as the first circumscribed polygon region before division or the second circumscribed polygon region after division.

That is, as shown in FIG. 6, in the comparative example, when using the principal axis of inertia to divide the bounding box, a new circumscribed region HB1, which is a bounding box including moving body pixels of a human body, and a circumscribed region HB2 including moving body pixels of a shadow in the bounding box are calculated.

Moreover, in the circumscribed region HB2, as shown by circles S1 and S2 in FIG. 6, a region larger than the moving body pixels of the actual shadow is contained. That is, in the comparative example, the circumscribed region HB2 has a significantly larger area than the region of the actual shadow, which adversely affects the calculation of the area ratio in the region selection unit 36. Thus, it is impossible to correctly select the region to be output to the object differentiation unit 37, and it is difficult to accurately differentiate the human body and shadow contained in the imaged image at the object differentiation unit 37. That is, compared to the comparative example, this embodiment applying a convex hull circumscribed region to the calculation of the area ratio can accurately differentiate a human body and its shadow even when the shadow exists at an angle other than 90 degrees with respect to the human body.

Figure 7:
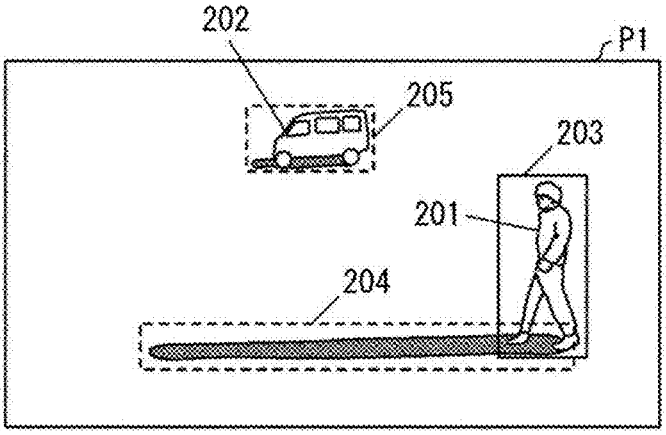
FIG. 7 is a diagram explaining another specific operation example of the imaging device.

Although the case where a human body is differentiated as a predetermined object has been described as an example in the above description, the imaging device 1 of the embodiment is not limited thereto. For example, as shown in FIG. 7, it may also be applied to imaged images including a vehicle 202 other than a human body 201.

Specifically, in the imaging device 1 of the embodiment, for the human body 201, since the area ratio is equal to or less than a threshold value, a convex hull circumscribed region including moving body pixels of the human body 201 and a convex hull circumscribed region including moving body pixels of the shadow of the human body 201 are created separately. Thus, for example, in a display image P1 on the display unit 4, a frame 203 including the human body 201 and a frame 204 including the shadow of the human body 201 are displayed.

On the other hand, for the vehicle 202, since the area ratio exceeds a threshold value, a convex hull circumscribed region including moving body pixels of the vehicle 202 and a convex hull circumscribed region including moving body pixels of the shadow of the vehicle 202 are not divided. Thus, for example, on the display unit 4, a frame 205 including both the vehicle 202 and its shadow is displayed.

Example Realized by Software

The functional blocks (especially the control unit 3) of the imaging device 1 may be realized by logical circuits (hardware) formed on integrated circuits (IC chips), etc., or may be realized by software.

In the latter case, the control unit 3 includes a computer that executes instructions of a program, which is software that realizes each function. This computer, for example, includes one or more processors and a computer-readable recording medium that has stored the program. In this computer, by the processor reading and executing the program from the recording medium, the purpose of the present invention is achieved.

As the processor, for example, a CPU (Central Processing Unit) may be used. As the recording medium, a "non-temporary tangible medium", for example, ROM (Read Only Memory), etc., as well as magnetic disks, cards, semiconductor memories, programmable logic circuits and the like may be used. Furthermore, RAM (Random Access Memory) etc. that deploys the program may be further included.

Moreover, the program may be supplied to the computer via any transmission medium (communication network or broadcast wave etc.) capable of transmitting the program. Furthermore, one embodiment of the present invention may be realized in the form of a data signal embedded in a carrier wave embodied by electronic transmission.

SUMMARY

An information processing device according to one aspect of the present invention is an information processing device that processes imaged images, which includes: a feature region detection unit that detects a feature region having a predetermined feature from an input imaged image; a first circumscribed polygon region calculation unit that calculates a first circumscribed polygon region as a convex hull circumscribed region that contains the feature region; a principal axis of inertia calculation unit that calculates a principal axis of inertia for the feature region; a region division unit that uses the calculated principal axis of inertia to divide the feature region; a second circumscribed polygon region calculation unit that calculates two second circumscribed polygon regions as convex hull circumscribed regions that respectively contain the divided feature regions; a region selection unit that selects either of the first circumscribed polygon region and the two second circumscribed polygon regions on the basis of an area ratio of the two second circumscribed polygon regions and the first circumscribed polygon region; and an object differentiation unit that executes an object detection processing on the first circumscribed polygon region or the two second circumscribed polygon regions selected by the region selection unit.

According to the above configuration, a feature region having a predetermined feature is detected, the principal axis of inertia for the detected feature region is calculated, and the calculated principal axis of inertia is used to divide the detected feature region. Furthermore, in the first circumscribed polygon region that contains the feature region before division and the second circumscribed polygon regions that respectively contain the two feature regions after division, a convex hull circumscribed region that contains the corresponding feature region is used. As a result, the selection processing of the first circumscribed polygon region or the two second circumscribed polygon regions in the region selection unit can be executed appropriately and accurately, and the object detection processing in the object differentiation unit can be executed with high accuracy. Consequently, it is possible to accurately differentiate an object from an imaged picture regardless of imaging conditions.

In the information processing device according to the one aspect, the first circumscribed polygon region calculation unit may further calculate a bounding box that contains the feature region, and the principal axis of inertia calculation unit may calculate the principal axis of inertia based on a positional relationship of a centroid of the feature region and either a center of the bounding box or a centroid of the convex hull circumscribed region.

According to this configuration, it is possible to accurately calculate the principal axis of inertia for the feature region. As a result, it is possible to more accurately differentiate an object from an imaged picture regardless of imaging conditions.

In the information processing device according to the one aspect, the object differentiation unit may differentiate a human body by executing object detection processing.

According to this configuration, it is possible for the object differentiation unit to accurately differentiate a human body.

In an information processing device according to the one aspect, the feature region detection unit may detect at least one of a moving region, a region having pixel values within a predetermined range, and a region enclosed by edges as the feature region.

According to this configuration, it is possible to accurately detect a feature region regardless of imaging conditions and to more accurately differentiate an object from an imaged picture.

Furthermore, an information processing method according to one aspect of the present invention is an information processing method that processes imaged images, which includes: a feature region detection process that detects a feature region having a predetermined feature from an input imaged image; a first circumscribed polygon region calculation process that calculates a first circumscribed polygon region as a convex hull circumscribed region that contains the feature region; a principal axis of inertia calculation process that calculates a principal axis of inertia for the feature region; a region division process that uses the calculated principal axis of inertia to divide the feature region; a second circumscribed polygon region calculation process that calculates two second circumscribed polygon regions as convex hull circumscribed regions that respectively contain the divided feature regions; a region selection process that selects either the first circumscribed polygon region or the two second circumscribed polygon regions on the basis of an area ratio of the two second circumscribed polygon regions and the first circumscribed polygon region; and an object differentiation process that executes an object detection processing on the first circumscribed polygon region or the two second circumscribed polygon regions selected in the region selection process.

According to this configuration, a feature region having a predetermined feature is detected, the principal axis of inertia for the detected feature region is calculated, and the principal axis of inertia is used to divide the detected feature region. Moreover, a first circumscribed polygon region that contains the feature region before division and second circumscribed polygon regions that respectively contain the two feature regions after division are used as convex hull circumscribed regions that contain corresponding feature regions. Thus, the selection processing of the first circumscribed polygon region or the two second circumscribed polygon regions in the region selection process can be executed appropriately and accurately, and the object detection processing in the object differentiation process can be executed with highly accuracy. As a result, it is possible to accurately differentiate an object from an imaged image regardless of imaging conditions.

Furthermore, a control program according to one aspect of the present invention is a control program that operates a computer as an information processing device, in which the computer is operated as the feature region detection unit, the first circumscribed polygon region calculation unit, the principal axis of inertia calculation unit, the region division unit, the second circumscribed polygon region calculation unit, the region selection unit, and the object differentiation unit.

According to this configuration, it is possible to accurately differentiate an object from an imaged image regardless of imaging conditions.

The present invention is not limited to the embodiments described above, various modifications may be made within the scope indicated in the claims, and embodiments obtained by appropriately combining technical means disclosed in the embodiments are also included in the technical scope of the present invention.

REFERENCE SIGNS LIST

1 Imaging device
3 Control unit
31 Feature region detection unit
32 First circumscribed polygon region calculation unit
33 Principal axis of inertia calculation unit
34 Region division unit
35 Second circumscribed polygon region calculation unit
36 Region selection unit
37 Object differentiation unit

What is claimed is:

1. An information processing device that processes images, the information processing device comprising:
   a processor, configured to:
   detect a feature region having a predetermined feature from an input image;
   calculate a first circumscribed polygon region as a convex hull circumscribed region that contains the feature region;
   calculate a principal axis of inertia for the feature region;
   use the calculated principal axis of inertia to divide the feature region;
   calculate two second circumscribed polygon regions as convex hull circumscribed regions that respectively contain the divided feature regions;
   select either the first circumscribed polygon region or the two second circumscribed polygon regions on the basis of a ratio of a combined area of the two second circumscribed polygon regions to the first circumscribed polygon region; and
   executes execute an object detection processing on the first circumscribed polygon region or the two second circumscribed polygon regions.

2. The information processing device according to claim 1,
   wherein the processor further calculates a bounding box that contains the feature region, and
   wherein the processor calculates the principal axis of inertia based on a positional relationship of a centroid of the feature region and either a center of the bounding box or a centroid of the convex hull circumscribed region.

3. The information processing device according to claim 1,
   wherein the processor differentiates a human body by executing an object detection processing.

4. The information processing device according to claim 1, wherein the processor detects at least one of a moving region, a region having pixel values within a predetermined range, or a region enclosed by edges as the feature region.

5. An information processing method that processes images, the information processing method comprising:

a feature region detection process that detects a feature region having a predetermined feature from an input image;

a first circumscribed polygon region calculation process that calculates a first circumscribed polygon region as a convex hull circumscribed region that contains the feature region;

a principal axis of inertia calculation process that calculates a principal axis of inertia for the feature region;

a region division process that uses the calculated principal axis of inertia to divide the feature region;

a second circumscribed polygon region calculation process that calculates two second circumscribed polygon regions as convex hull circumscribed regions that respectively contain the divided feature regions;

a region selection process that selects either the first circumscribed polygon region or the two second circumscribed polygon regions on the basis of a ratio of a combined area of the two second circumscribed polygon regions to the first circumscribed polygon region; and an object differentiation process that executes an object detection processing on the first circumscribed polygon region or the two second circumscribed polygon regions selected in the region selection process.

6. A non-transitory computer-readable recording medium recording a control program that operates a computer to:

detect a feature region having a predetermined feature from an input image;

calculate a first circumscribed polygon region as a convex hull circumscribed region that contains the feature region;

calculate a principal axis of inertia for the feature region;

use the calculated principal axis of inertia to divide the feature region;

calculate two second circumscribed polygon regions as convex hull circumscribed regions that respectively contain the divided feature regions;

select either the first circumscribed polygon region or the two second circumscribed polygon regions on the basis of a ratio of a combined area of the two second circumscribed polygon regions to the first circumscribed polygon region; and execute an object detection processing on the first circumscribed polygon region or the two second circumscribed polygon regions.

7. The information processing device according to claim 2, wherein the processor differentiates a human body by executing an object detection processing.

8. The information processing device according to claim 2, wherein the processor detects at least one of a moving region, a region having pixel values within a predetermined range, or a region enclosed by edges as the feature region.

9. The information processing device according to claim 3, wherein the processor detects at least one of a moving region, a region having pixel values within a predetermined range, or a region enclosed by edges as the feature region.

* * * * *